No. 886,934. PATENTED MAY 5, 1908.
D. A. BRADFORD.
VERMIN EXTERMINATING FEED BOX.
APPLICATION FILED JULY 15, 1907.
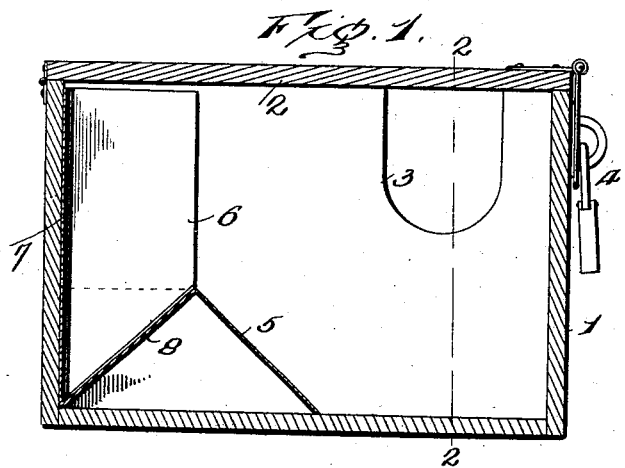
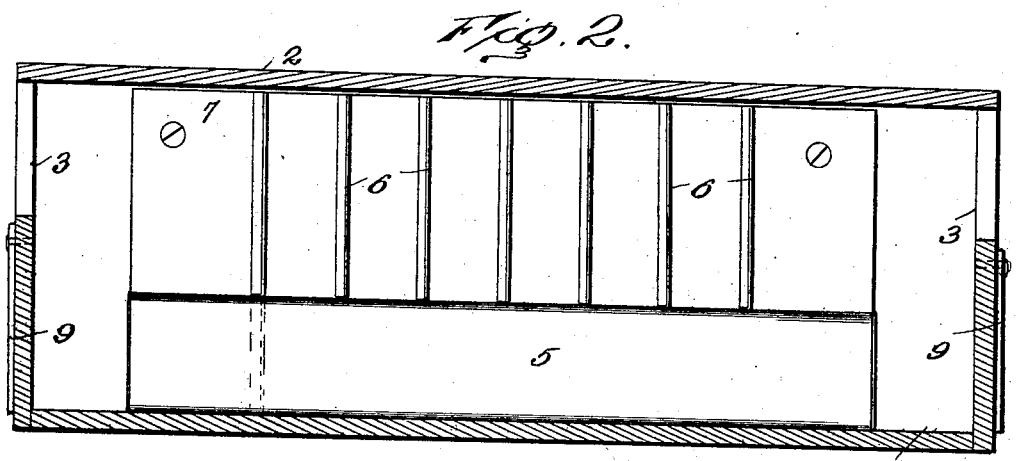
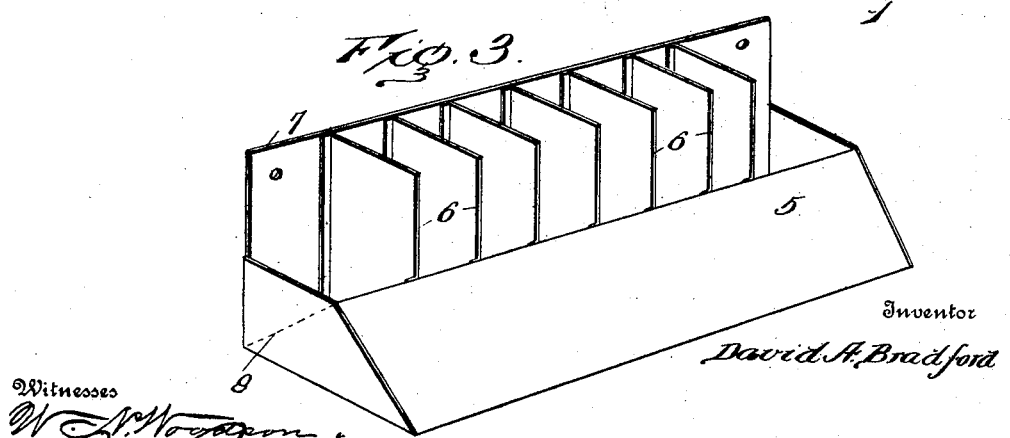

UNITED STATES PATENT OFFICE.

DAVID A. BRADFORD, OF CHATTANOOGA, TENNESSEE.

VERMIN-EXTERMINATING FEED-BOX.

No. 886,934.        Specification of Letters Patent.        Patented May 5, 1908.

Application filed July 15, 1907. Serial No. 383,795.

*To all whom it may concern:*

Be it known that I, DAVID A. BRADFORD, citizen of the United States, residing at Chattanooga, in the county of Hamilton and State of Tennessee, have invented certain new and useful Improvements in Vermin-Exterminating Feed-Boxes, of which the following is a specification.

The process of exterminating rats, mice and similar vermin by means of poison food is always open to more or less objection owing to the fact that the poisonous material is liable to fall within the reach of small children or domestic animals and thereby bring about disastrous results.

The object of the invention has been to overcome this objection by providing a novel receptacle for the poisoned food which is peculiarly designed so as to permit the mice or the like to have ready access to the same and at the same time effectively hold the poisonous material out of the reach of chickens or other domestic animals.

For a full description of the invention and the merits thereof and also to acquire a knowledge of the details of construction and the means for effecting the result, reference is to be had to the following description and accompanying drawings, in which:

Figure 1 is a transverse sectional view through the device. Fig. 2 is a longitudinal sectional view on the line 2—2 of Fig. 1. Fig. 3 is a detail view of the feed receptacle detached.

Corresponding and like parts are referred to in the following description and indicated in all the views of the drawings by the same reference characters.

In its broadest form the invention resides in placing a receptacle containing the poisoned food within a box or like inclosure which prevents domestic animals from obtaining access to the poison but is provided with openings for the ingress and egress of the mice or like vermin.

The numeral 1 designates a box of any approved construction which is provided with a closure 2 and is formed with the openings 3 through which the mice can readily enter or leave the box. In the present instance the openings 3 are formed by notches in the ends of the box and the closure 2 is in the nature of a swinging cover and may be securely held in a closed position by any suitable form of lock such as that indicated at 4.

Arranged within the box 1 is a receptacle for receiving the poisoned food, the said receptacle being preferably subdivided into a plurality of compartments and being peculiarly designed so as to prevent the mice from bodily entering the same and carrying the poisoned food out of the box upon their feet.

Specifically describing the receptacle it will be observed that the same is in the nature of a trough the forward side 5 of which is inclined upwardly, the said trough being subdivided into a plurality of feed compartments by means of the transverse partitions 6. These partitions together with the back 7 of the trough extend upwardly above the front 5 and the back 7 is secured to the interior of the box by screws or other suitable means. Leading up to the front of the trough is an inclined plane 8 which together with the inclined side 5 thereof forms an inverted V shape structure constituting the base of the feed receptacle.

The various compartments may be supplied with food containing poison of any desired nature and the end compartments are preferably filled with water.

This construction admits the mice to have ready access to the contents of the various compartments of the feed receptacle but as has been previously mentioned prevents them from entering the receptacle bodily and scattering the feed around the box or carrying it out of the same. Under some conditions it may be found desirable to provide closures 9 for the openings 3 so that the openings may be closed during the day and uncovered at night, such precaution being sometimes necessary to prevent young chickens from entering the box.

Having thus described the invention, what is claimed as new is:

1. In a device of the character described, the combination of a box having an opening therein, and a V-shaped trough located within the box and sub-divided into a plurality of compartments, the back of the trough being extended upwardly and secured to the interior of the box.

2. In a device of the character described, the combination of a box having an opening therein, a feed trough located within the box and having the back thereof extended upwardly and secured to the interior of the box, and an inclined plane leading up to the feed trough.

3. In a device of the character described, the combination of a box having an opening therein, a feed trough within the box and having one side thereof inclined forwardly while the opposite side is extended upwardly and secured to the interior of the box, and transverse partitions subdividing the trough into a plurality of compartments and extending upwardly above the before mentioned inclined front.

4. In a device of the character described, the combination of a box having an opening therein, a feed trough located within the box and having one side thereof inclined forwardly while the opposite side is extended upwardly, transverse partitions subdividing the trough into a plurality of compartments and extending upwardly beyond the inclined side thereof, and an inclined plane leading up to the inclined side of the trough.

In testimony whereof I affix my signature in presence of two witnesses.

DAVID A. BRADFORD. [L. S.]

Witnesses:
E. M. ANDERSON,
W. T. McEACHERN.